Jan. 25, 1955     H. M. GEYER     2,700,542
VIBRATION DRIVEN ACTUATOR

Filed April 27, 1953     2 Sheets-Sheet 1

INVENTOR.
Howard M. Geyer
BY
Craig V. Morton
Attorney

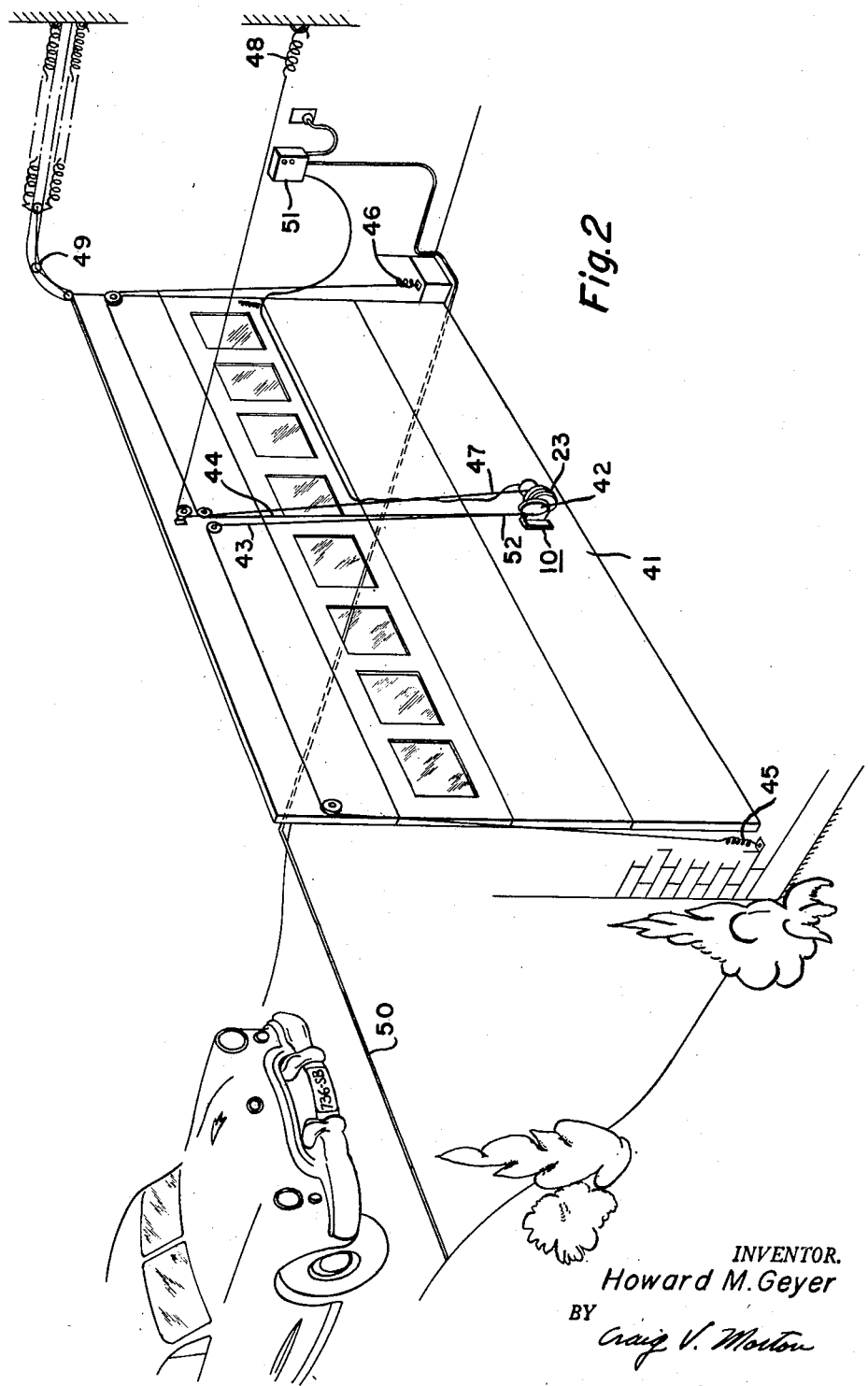

United States Patent Office 2,700,542
Patented Jan. 25, 1955

2,700,542

VIBRATION DRIVEN ACTUATOR

Howard M. Geyer, Dayton, Ohio, assignor to General Motors Corporation, Detroit, Mich., a corporation of Delaware Application April 27, 1953, Serial No. 351,431

5 Claims. (Cl. 268—59)

The present invention pertains to actuators and more particularly to vibration driven rotary actuators.

One of the recurring problems that manifests itself in rotary actuators is that of the excessive starting load imposed on the rotating driving means upon initial operation thereof. In an effort to devise an economical rotary actuator for effecting movement of substantial loads without resort to speed reducing gear trains, and further provide a motor driven actuator wherein no substantial load is imposed on the motor during the starting period, this invention employs a vibration drive in combination with a no-back device which determines direction of actuator movement. Moreover, by employing the vibration drive principle, substantial torque multiplication is achieved. Accordingly, among my objects are the provision of a torque amplifying, vibration driven actuator, an actuator of the aforesaid character wherein the vibrations are induced by rotary driving means; and an actuator including no-back means selectively operable to permit movement in either direction.

The aforementioned and other objects are accomplished in the present invention by employing vibration inducing means which are operable to effect rotary movement of a power driven element in either direction as determined by the position of the no-back means. Specifically, the embodiment disclosed includes an electric motor, the shaft of which is operably connected to a pulley journaled for rotation by a bearing concentrically disposed with respect to the motor shaft. A drum is journaled for rotation about a sleeve concentric with the aforementioned bearing, the drum having a stub shaft projecting from one face thereof. A second pulley is rotatably supported by the stub shaft, the two pulleys being interconnected by suitable belting. The pulley mounted on the stub shaft carries an eccentric weight or mass which is adapted to induce vibrations in the drum, which vibrations cause rotation thereof.

The outer periphery of the drum is formed with a spiral groove about which a flexible cable may be trained. The cable is employed as a power transmission means for transmitting motion of the drum to any suitable load device. The inner periphery of the drum constitutes a brake surface frictionally engageable by either end of a split band. The friction band cooperates with the inner periphery of the drum to form a no-back device which determines the direction of rotation of the drum effected by the vibration induced due to rotation of the eccentric weight. The invention comprehends manual means for holding either end of the band to permit drum movement in either clockwise or counterclockwise direction, and when both ends of the band are held, the drum may be manually rotated about its sleeve bearing in both directions.

In the disclosed embodiment, the rotary actuator is utilized to effect movement of an overhead type garage door. By reason of the fact that direction control is provided by the no-back device, the actuator may be employed to either raise or lower the garage door. However, it is deemed to be readily apparent that the actuator may be adapted for numerous other installations requiring a rotary actuator providing substantial torque multiplication, and the illustration of its use for effecting movement of a garage door is only exemplary.

Further objects and advantages of the present invention will be apparent from the following description, reference being had to the accompanying drawings wherein a preferred embodiment of the present invention is clearly shown.

In the drawings:

Fig. 2 is a somewhat diagrammatic view illustrating the actuator of this invention as applied to operate an overhead garage door.

Figure 1:
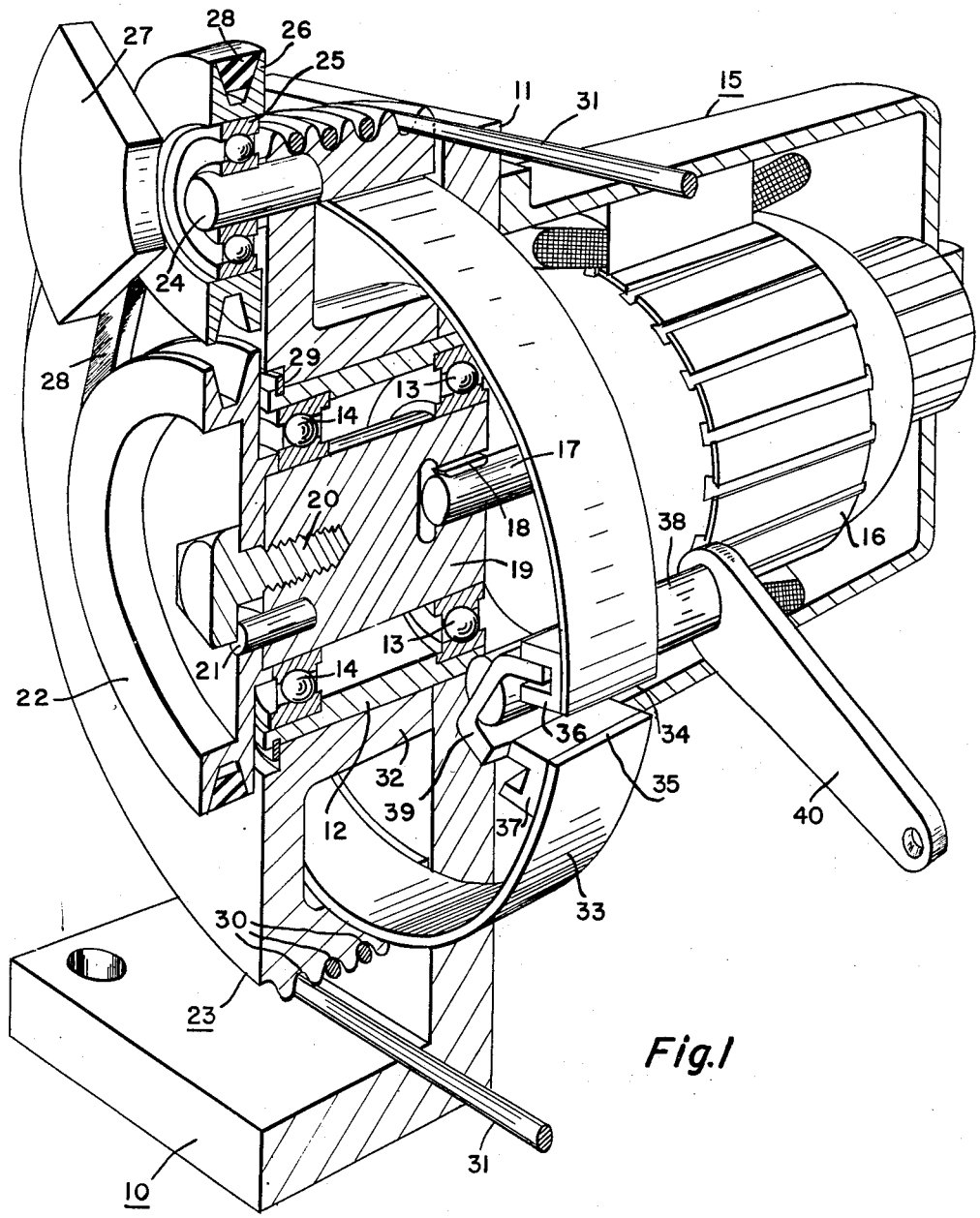
Fig. 1 is a perspective view, partly in section and partly in elevation, of a rotary actuator constructed according to this invention.

With particular reference to Fig. 1, the actuator is shown supported by a generally L-shaped frame member 10. The upright portion 11 of the L-shaped frame member has an opening therein within which a sleeve 12 is anchored. The sleeve 12 extends outwardly from the front of the upright portion 11 as viewed in Fig. 1 and supports the outer races of axially spaced ball bearing means 13 and 14. Supported by the back side of the upright portion 11, as viewed in Fig. 1, and rigidly attached thereto is a motor housing 15. The motor housing encloses an electric motor 16 which may be of either the alternating current or direct current type. The motor 16 includes a shaft 17 which projects through the opening of the upright portion 11 of the L-shaped frame member and is keyed at 18 to a member 19 which carries the inner races of bearings 13 and 14 and is supported for rotation within the bearings 13 and 14. Attached to one end of the member 19 by means of a screw device 20 and a pin 21, is a first pulley 22. It is readily apparent that upon rotation of the motor driven shaft 17, rotation will be imparted to the pulley 22. The pulley 22 constitutes the rotating driving member of the actuator to be described.

A drum 23 is supported for rotation about the fixed sleeve 12. The drum 23 carries a projecting stub shaft 24 which supports the inner race of a ball bearing assembly 25. The outer race of ball bearing assembly 25 is carried by a second pulley 26 which is journaled for rotation about the bearing 25. The pulley 26 carries an eccentric weight or off-center mass 27 and is rotatably connected to the pulley 22 by means of a belt 28. The drum 23 is restrained against axial movement relative to the fixed sleeve 12 by means of a snap ring 29 supported in an annular groove in the sleeve 12 and engaging an edge surface of the drum. The exterior periphery of the drum is formed with a spiral groove 30 about which a flexible cable 31 may be trained. The drum 23 constitutes the driven member of the actuator and the flexible cable 31 is employed to transmit movement of the drum 23 to any suitable load device.

Circumscribing a hub 32 of the drum, which is rotatably supported on the fixed sleeve 12, is a split metallic band 33. The two band ends 34 and 35 have attached to their inner peripheries channel members 36 and 37 respectively. A shaft 38 is supported for arcuate movement in the upright portion 11 of the L-shaped frame 10, one end of the shaft 38 having affixed thereto a yoke member 39, the ends of which may be moved into the channel members 36 and 37. The other end of the shaft 38 is provided with an actuating handle 40. The outer periphery of the split band 33 is adapted to frictionally engage the inner periphery of the drum 23 to control the direction of drum movement. The split metal band 33 constitutes a no-back device. The no-back device operates in the following manner: If the handle 40 is moved to the position shown in Fig. 1 wherein one end of the yoke member 39 engages channel member 36 associated with end 34 of the band, end 34 will then form the reaction member that absorbs torque in the clockwise direction. Hence, as centrifugal force of the unbalanced weight 27 exerts a clockwise torque on drum 23, the friction of free end 35 of no-back band 33 causes the band to expand and press against the inner portion of drum 23 thereby locking band 33 and drum 23 together. As the weight spins around and creates a torque in the counterclockwise direction on drum 23, this torque will not be absorbed by the band 33 since friction of free end 35 tends to make band shrink to a smaller diameter and away from drum. So as weight 27 spins about shaft 24 it exerts centrifugal force, which, when tangent to drum 23 creates torque on drum 23 about its axis. These torques will be alternating and in Figure 1, and with band set as shown, the clockwise torque will be absorbed through the band and, hence, through fixed member 11, while torques in counterclockwise direction will cause the drum 23 to rotate moving the load through the cable. Should lever 40 be moved to the other extreme position in Figure 1, yoke 39 would hold end 35 of band 33 fixed through channel 37. Band end 34 would be free and absorb torques in counterclockwise direction allowing the drum 23 to rotate in clockwise direction. If lever 40 were put in the mid position, both ends of the band would be fixed and neither end could unwind the band 33 thereby locking the drum 23. Hence, in the mid position, the drum could be rotated in either direction by the unbalanced weight to cause the drum to oscillate through an amplitude proportional to the masses and motor speed.

When the motor driven shaft 17 rotates the pulley 22, rotation will be imparted to the pulley 26 by the interconnecting belt 28. Rotation of the pulley 26 and its eccentric weight 27 will, as is readily apparent, result in the establishment of vibrations. The vibrations caused by rotation of the pulley 26 and its eccentric weight 27 will be transmitted to the drum 23 through the stub shaft 24. These vibrations tend to cause rotary movement of the drum 23 about its bearing 12. However, the vibrations, being of an erratic nature, and varying with the position of the eccentric weight, some means must be provided to control the direction of rotation of the drum 23. Thus, the present invention conveniently employs the no-back device previously described. By positioning the handle 40 so as to hold the end 34, rotation of the motor shaft 17 and the pulleys 22 and 26 will result in a creeping rotation of the drum 23 in a counterclockwise direction. As the drum 23 rotates about its bearing surface 12, it is readily apparent that the pulley 26, carried by the drum 23, will experience a planetary movement. That is, the pulley 26 will be rotated about bearing 25 by the pulley 22 and the interconnecting belt 28. Moreover, the pulley 26 will be rotated about the sleeve 12 with the drum 23 by reason of its being carried by the drum.

The vibration drive functions in a manner similar to a gear reduction whereby the speed of the driven actuator 23 is considerably less than the speed of the driving pulley 22. However, the consequent reduction in speed between the driving and driven members of the actuator results in a substantial torque amplification. For example, an actuator employing the induced vibration drive of this invention when driven by a quarter horse power electric motor delivering six inch-pounds of torque to the driving pulley 22, will result in an output torque on the driven drum 23 of about 1600 inch-pounds. Thus it is readily apparent that the vibration driven actuator provides phenomenal torque multiplication. Moreover, when operation of the motor 16 is initiated, the only load driven by the motor is that of the off-center weight 28. Thus, a motor having exceedingly low starting torque may be employed to drive the pulley 22. This feature will materially reduce the cost of providing rotary actuators for moving substantial loads.

With reference to Fig. 2, the actuator heretofore described is shown in a garage door installation. The L-shaped frame 10 is attached adjacent the lower edge of an overhead garage door 41. The actuator pulleys are housed in a casing 42. Cables 43 and 44 are suitably trained about pulleys adjacent the upper edge of the garage door in the conventional manner and thence connected to springs 45 and 46 adjacent the bottom of the door frame, the cables 43 and 44 being joined at 52 and trained around the drum 23 as cable 47. Another portion of cable 47 is trained about a pulley adjacent an upper portion of the garage door, the end of cable 47 being connected to a spring 48 attached to a fixed support, such as a garage beam or joist. The side ends of the garage door are adapted for movement in channels, only one of which, 49, is shown. Energization of the actuator motor may be effected automatically through a pressure switch 50 disposed in the driveway or manually by a push button switch 51 within the garage. Upon energization of the actuator motor and depending in which direction drum movement is permitted by the no-back device, rotary movement of the drum 23 will either raise or lower the garage door 41 upon closing of the pressure switch 50 or the push button switch 51.

From the aforegoing it is readily apparent that this invention provides a rotary actuator wherein the starting load imposed upon the driving member is minimal. Moreover, by employing an induced vibration drive between the driving and driven actuator members, substantial torque multiplication is achieved. In addition proportionalized direction control is provided by the no-back device, and by reason of there being no mechanical connection between the driving and driven members, should the load device, to be moved, become immovable for some reason, no harm will ensue to the driving motor.

While the embodiment of the present invention as herein disclosed, constitutes a preferred form, it is to be understood that other forms might be adopted.

What is claimed is as follows:

1. In a power transmitting device, a rotary driving member, a rotatable driven member, vibration inducing means operably associated with the driving and driven members for effecting rotation of the driven member in response to rotation of the driving member, and means associated with the driven member determining the direction of rotation thereof, said last recited means comprising a no-back device including a split band supported adjacent the interior periphery of said driven member, and means operably associated with the ends of said split band for holding either end thereof so as to prevent rotation of said driven member in one direction while permitting rotation thereof in the opposite direction.

2. In a power transmitting device, a support member, bearing means carried by said support member, a rotary driving element journaled on said bearing means, a rotatable driven element journaled on said bearing means, a shaft carried by said driven element, an eccentric mass adapted for rotation about said shaft, means imparting rotation to said eccentric mass upon rotation of said driving element, the construction and arrangement being such that rotation of said eccentric mass induces vibrations in said driven element, which vibrations effect rotation of said driven element, and means operatively associated with the driven element for determining the direction of rotation thereof, said last recited means comprising a no-back device including a split band supported adjacent the interior periphery of said driven element, and means operably associated with the ends of said split band for holding either end thereof so as to prevent rotation of said driven element in one direction while permitting rotation thereof in the opposite direction.

3. In a power transmitting device, a support member, a stationary sleeve bearing carried by the support member and projecting axially from one side thereof, bearing means mounted in the inner periphery of said sleeve bearing, pulley carrying means supporting a first pulley for rotation in said bearing means, a drum rotatably supported on the outer periphery of said sleeve bearing, said drum having a shaft extending from a side thereof, means supporting a second pulley for rotation about said shaft, an eccentric weight attached to said second pulley for rotation therewith, means interconnecting said pulleys for rotation, rotary driving means attached to and carried by said support member, means interconnecting the rotary driving means and said pulley carrying means, means carried by said drum for a connection to a movable load element, the construction and arrangement being such that upon rotation of said pulleys by said rotary driving means, the eccentric weight carried by said second pulley will induce vibrations in said drum effecting rotation thereof, and means engageable with the interior of said drum for permitting rotation thereof in one direction while restraining rotation thereof in the opposite direction.

4. In a power transmitting device, a support member, a stationary sleeve bearing carried by the support member and projecting axially from one side thereof, bearing means mounted in the inner periphery of said sleeve bearing, pulley carrying means supporting a first pulley for rotation in said bearing means, a drum rotatably supported on the outer periphery of said sleeve bearing, said drum having a shaft extending from a side thereof, means supporting a second pulley for rotation about said shaft, an eccentric weight attached to said second pulley for rotation therewith, means interconnecting said pulleys for rotation, rotary driving means attached to and carried by said support member, means interconnecting the rotary driving means and said pulley carrying means, means carried by said drum for a connection to a movable load element, the construction and arrangement being such that upon rotation of said pulleys by said rotary driving means, the eccentric weight carried by said second pulley will induce vibrations in said drum effecting rotation thereof, and means operatively associated with the drum determining the direction of rotation thereof.

5. The combination set forth in claim 4 wherein the means determining the direction of rotation of the drum comprises a no-back device including a split band supported adjacent the interior periphery of said drum, and means carried by said support member and operably associated with the ends of said split band for holding either end of the band to prevent rotation of said drum in one direction while permitting rotation thereof in the opposite direction.

References Cited in the file of this patent

UNITED STATES PATENTS

| | | |
|---|---|---|
| 1,860,383 | Chalmers | May 31, 1932 |
| 1,966,107 | Slonneger | July 10, 1934 |
| 2,007,442 | Dodge | July 9, 1935 |
| 2,628,090 | Verdier | Feb. 10, 1953 |